L. E. WATERMAN.
HAY RAKE AND TEDDER.
APPLICATION FILED APR. 11, 1911.
1,072,677.
Patented Sept. 9, 1913.
3 SHEETS—SHEET 1.
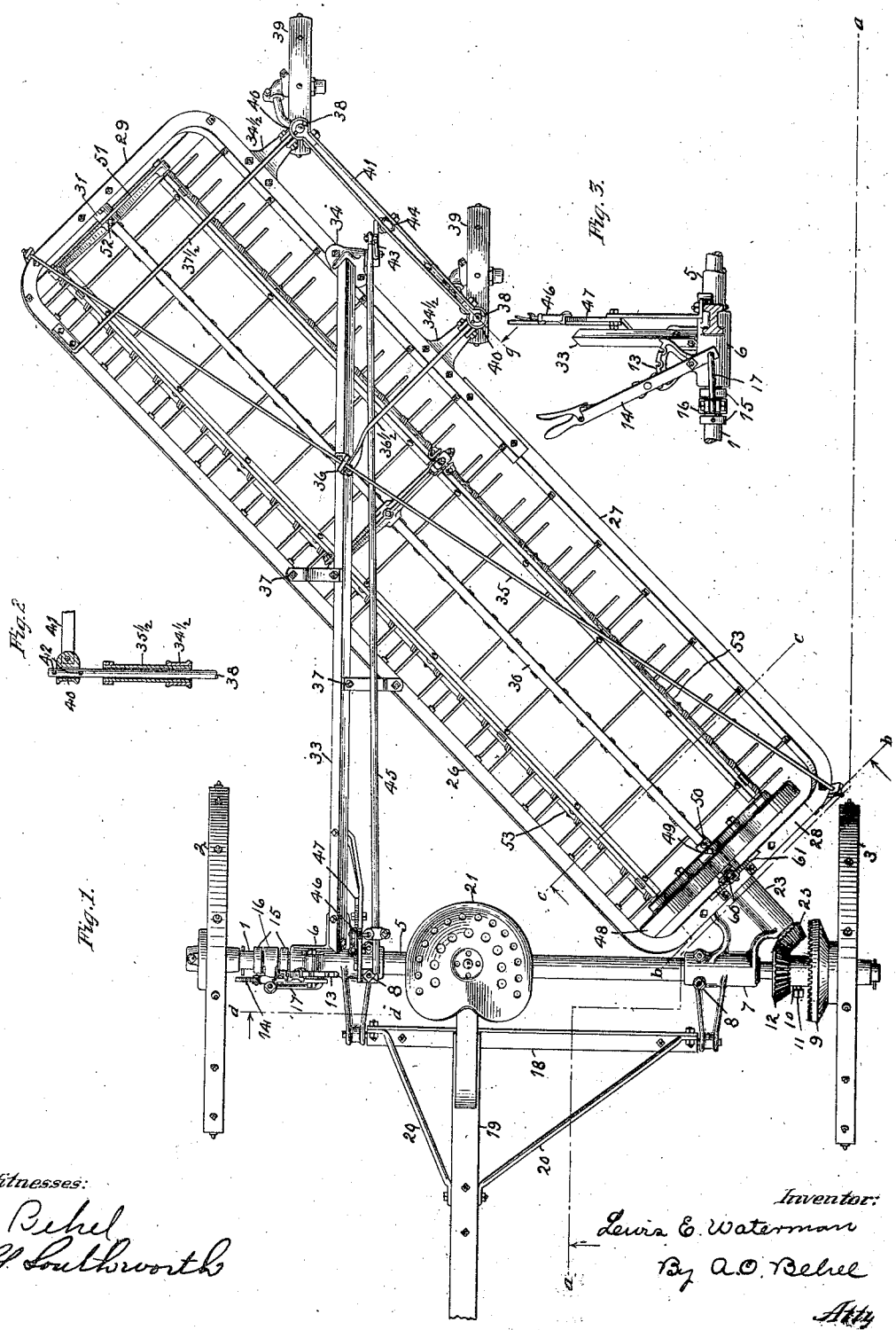
Witnesses:
E. Behel
S. Southworth
Inventor:
Lewis E. Waterman
By A. O. Behel
Atty L. E. WATERMAN.
HAY RAKE AND TEDDER.
APPLICATION FILED APR. 11, 1911.
1,072,677.
Patented Sept. 9, 1913.
3 SHEETS—SHEET 2.
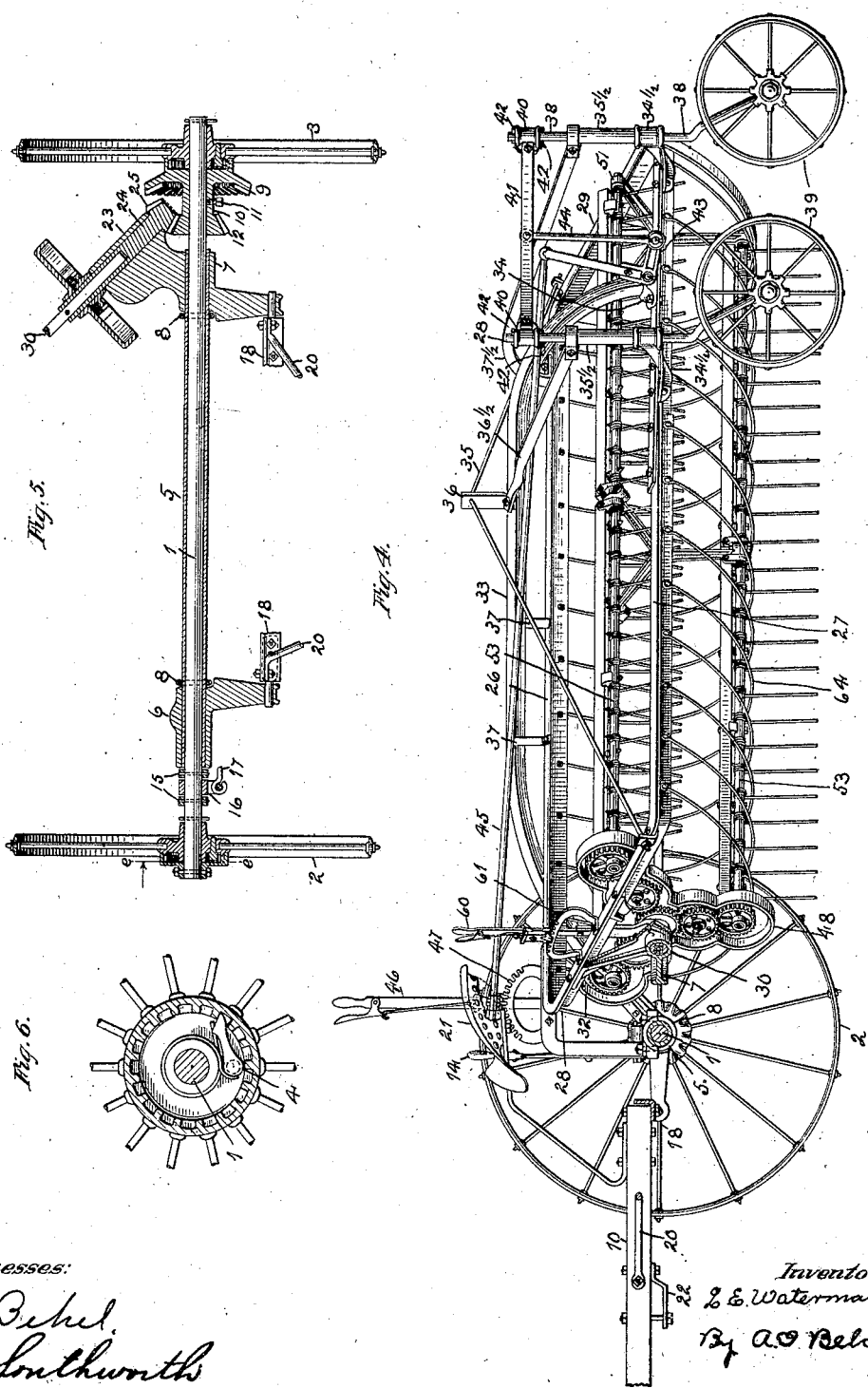
Witnesses:
E. Behel
C. Southworth
Inventor:
L. E. Waterman
By A. O. Behel
Atty

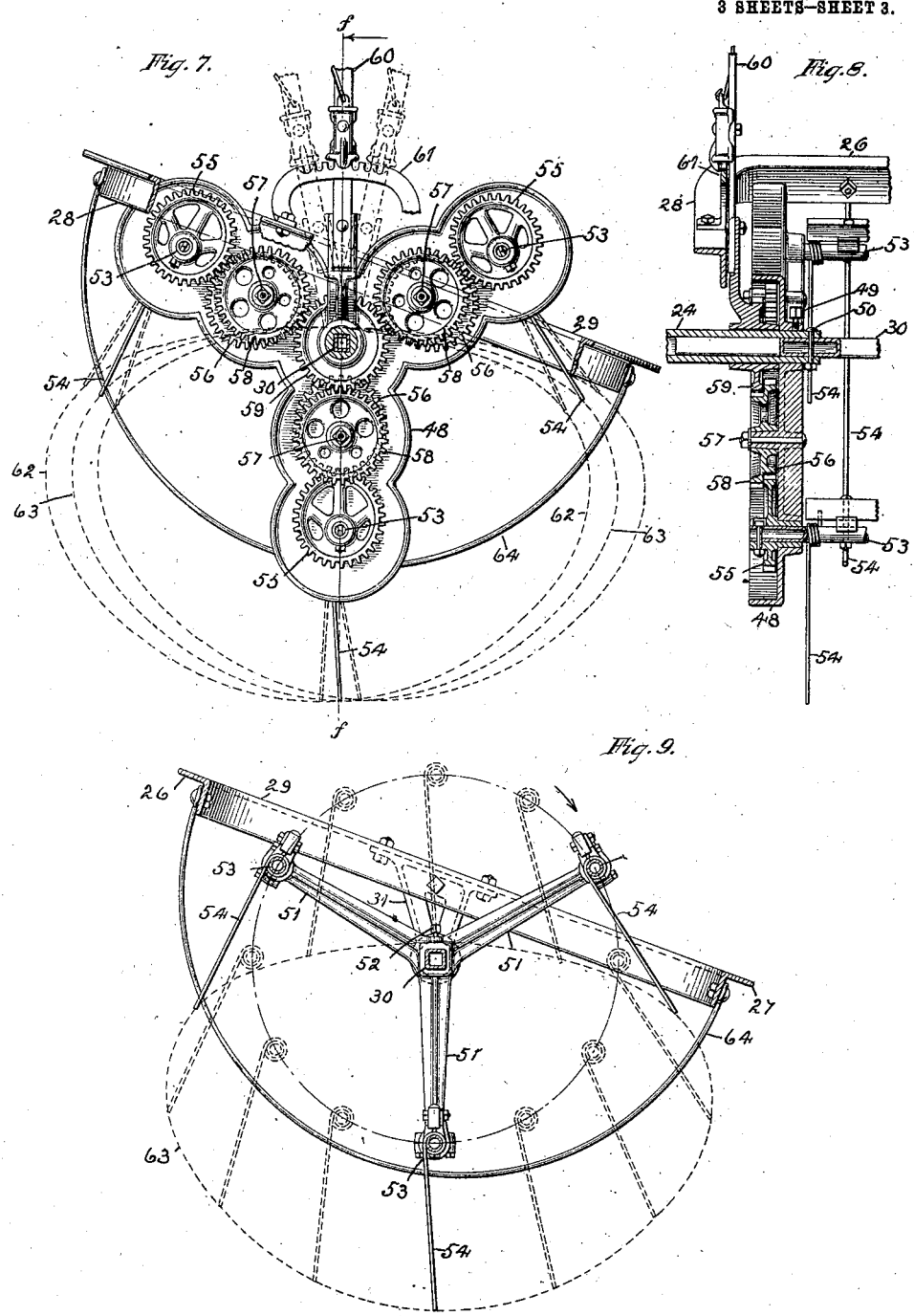

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

HAY RAKE AND TEDDER.

1,072,677.  Specification of Letters Patent.  Patented Sept. 9, 1913.

Application filed April 11, 1911. Serial No. 620,420.

*To all whom it may concern:*

Be it known that I, LEWIS E. WATERMAN, a citizen of the United States, residing at Rockford, in the county of Winnebago and State of Illinois, have invented certain new and useful Improvements in Hay Rakes and Tedders, of which the following is a specification.

The object of this invention is to construct a side delivery rake, which can without changing the machine, be converted into a hay tedder by simply rotating the teeth in the opposite direction.

The further object of this invention is to support the rear portion of the rake upon two wheels with an equalizing device between them so that the vertical movement thereof is one-half that of a rake supported upon a single wheel.

In the accompanying drawings Figure 1 is a plan view. Fig. 2 is a section on dotted line $g, g$, Fig. 1. Fig. 3 is a section on dotted line $d\,d$ Fig. 1. Fig. 4 is a section on dotted line $a\,a$ Fig. 1. Fig. 5 is a horizontal section through the front supporting wheels and the bearing of the frame, also the gear drive connection with the rake head. Fig. 6 is a vertical section on dotted line $e\,e$ Fig. 5. Fig. 7 is a section on dotted line $b\,b$ Fig. 1. Fig. 8 is a section on dotted line $f\,f$ Fig. 7. Fig. 9 is a section on dotted line $c\,c$ Fig. 1.

The axle 1 is supported by the wheels 2 and 3 and the usual clutch 4 shown at Fig. 6 is employed to connect the wheels with the axle. A sleeve 5 is supported by the axle and two bearings 6 and 7 are connected to the sleeve by the U bolts 8. A bevel gear 9 is connected to a sleeve 10 which is connected to the axle 1 by the set screw 11. A bevel pinion 12 is also connected to the sleeve 10.

From the bearing 6 extends vertically a toothed quadrant 13, and a hand lever 14 is pivotally connected to the bearing and its dog engages the toothed quadrant. Two collars 15 are pinned to the axle and between these collars is located a clasp 16 to which a link 17 is connected, and the other end of this link is connected to the hand lever 14. By means of the hand lever 14 the sleeve 5 can be moved lengthwise on the axle 1 which will carry the bearings 6 and 7 with it. A bar 18 is pivotally supported by the forward portions of the bearings 6 and 7, and to this bar is connected a tongue 19. Braces 20 connect with the tongue also with the bar 18. A seat 21 is supported by the tongue, and a draft connection 22 is also connected to the tongue. The bearing 7 has a rearward extension 23 which supports the hub 24 of a bevel pinion 25. A rectangular frame comprises the side bars 26 and 27 and the end bars 28 and 29.

A square hollow shaft 30 has one end located in the hub 24 of the gear 25, and its other end is located in a bracket 31 depending from the underface of the end bar 29 of the rectangular frame. Arms 32 extend from the bearing 7 and are connected to the underface of the end bar 38 of the rectangular frame. A square bar 33 has one end connected to the bearing 6 and its other end is connected to a bracket 34 secured to the side bar 27 of the rectangular frame near its rear portion.

A brace rod 35 extends diagonally of the rectangular frame and its ends connected thereto and its center portion is connected to the bar 33 by the bracket 36, and straps 37 connect the bar 33 and the side bar 26 of the rectangular frame. To the bar 27 of the rectangular frame are secured two brackets 34½ and each provided with an upwardly extending tubular section 35½. A brace bar 36½ connects one of the sections with the bar 33 and a brace bar 37½ connects the other section with the side bar 26 of the rectangular frame. These brace bars serve to hold the tubular extensions in a vertical position. In each of the tubular sections 35½ is located a shaft 38 to the lower end of which is connected a caster wheel 39. Around the upper portions of each of the shafts 38 is loosely mounted a collar 40, and these collars are connected by double bars 41. The collars are held in position by pins 42. To the bracket 34 is pivoted a bell-crank 43 and to one arm of this bell-crank is pivoted an upright bar 44, the upper end of which is located between the bars 41 and pivotally connected thereto. To the other arm of this bell-crank is pivoted a rod 45 which extends to the forward portion of the rake, and is connected to a hand-lever 46. A toothed segment 47 is supported by the bar 33 and the bearing 6. The hand lever 46 has a pivotal connection with the segment 47 and is provided with the usual dog and thumb lever engagement with the toothed segment. By means of this hand lever 46 the bell-crank 43 may be rocked which will raise or lower the rear portion of the rectangular frame by sliding the tubular sections 35½ on the shafts 38.

By the employment of the two wheels 39 and the bars 41 in their connection with the upright bar 44 each wheel in passing over an obstruction will raise the rear portion of the rectangular frame only one half the distance it would if it was connected directly to the frame thereby allowing the rake teeth to more nearly contact with the ground at all times.

To the hub 24 is connected a casing 48 by the set screw 49, and this hub is connected to the square shaft 30 by the bolt 50. To the other end of this square shaft 30 is secured a three armed spider 51 by the set screw 52. Three shafts 53 are mounted in the spider arms 51 and in the casing 48 so as to turn therein, and to each shaft 53 are secured spring teeth 54. To each of the shafts 53 is pinned an eccentric elliptical spur gear 55. Intermediate eccentric elliptical spur gears 56 are mounted on the studs 57 supported by the casing 48 and mesh with the eccentric elliptical spur gear 55. A spur gear 58 is formed either integrally with the eccentric elliptical gear 56 or connected to revolve with it on the stud 57. A spur gear 59 is loosely mounted on the hub 24 and to the hub of this gear is connected a hand lever 60 which is provided with a thumb latch and dog engagement with a toothed segment 61 secured to the end bar 28 of the rectangular frame. This spur gear 59 meshes with the spur gears 58.

When the bevel gear 12 is in mesh with the bevel pinion 25, the shaft 30 and the spider 51 and casing 48 connected to it will be rotated in the direction indicated by the arrow on Fig. 9. This rotation of the spider and casing will cause the gears 55 to be oscillated through their gear connection with the stationary center gear 59. These rotations and oscillations will impart movements to the teeth 54 in a path indicated by the dotted line Fig. 9, and in the central dotted line Fig. 7. By forming the gears 55 and 56 elliptical and eccentric, the teeth 54 do not stand in a vertical position throughout their movements, but have a swinging movement as indicated in dotted lines Fig. 9. This swinging movement tends to lift the hay and roll it along into a windrow instead of bodily pushing it, which it does when the teeth stand vertically, and by swinging the teeth a greater range of movement is had thereby increasing the distance the teeth remain or practically remain near the ground. By moving the hand lever to the right hand facing the lever, the teeth will travel in a path shown by the dotted line 62 in Fig. 7, and when the hand lever is in a vertical or normal position, the teeth will travel in the path indicated by the dotted line 63 Fig. 7. The strippers 64 serve to shed the hay from the teeth and prevent the hay being carried over the teeth.

By means of the hand lever 14 the forward end of the frame is shifted so the bevel gear 9 may be placed in mesh with the bevel pinion 25, and in drawing the machine over the field the rake teeth will be moved in the opposite direction thereby producing a hay tedder. The gear 9 being larger than the gear 12, the shaft 30 will be rotated faster when the machine is used as a hay tedder.

By means of the hand lever 60 and its engagement with the toothed segment 61, the gear 59 is rocked which will rock the gears 55, thereby locating the teeth 54 either ahead or in rear of the center position as shown in solid and dotted lines Fig. 7. The changing of the relation of the teeth to the ground will carry the hay farther forward when used as a hay rake, and will, when used as a hay tedder carry the hay farther to the rear.

I claim as my invention.

1. In a combined hay rake and tedder, the combination of supporting wheels, an axle supported by the wheels, one end of a frame supported by the axle, supports for the rear portion of the frame, a shaft supported by the frame, a rake mounted on said shaft, a gear connected to the shaft, two gears connected to the axle, and means for moving the frame along the axle whereby the gear on the shaft may be brought into or out of engagement with either of the gears on the axle.

2. In a combined hay rake and tedder, the combination of supporting wheels, an axle supported by the wheels, one end of a frame supported by the axle, supports for the rear portion of the frame, a shaft supported by the frame, a rake mounted on said shaft, a gear connected to the shaft, two gears connected to the axle, and a hand lever having a connection with said frame adapted to move the frame along the axle whereby the gear on the shaft may be brought into or out of engagement with either of the gears on the axle.

3. In a combined hay rake and tedder, the combination of supporting wheels, an axle supported by the wheels, a frame supported by the axle and slidable longitudinally thereon, a shaft carried by the frame, a rake mounted on the shaft, a gear carried by the shaft, two gears fixedly secured to said axle, and means for sliding the frame longitudinally upon said axle whereby the gear on the shaft may be brought into and out of engagement with either of the gears on the axle.

4. In a combined hay rake and tedder, the combination of supporting wheels, an axle supported by the wheels, the forward end of a frame supported by the axle, suitable wheel supports for the rear portion of the frame, a shaft supported by the frame, and rotatable by the supporting wheels, a casing connected to the shaft, elliptical and eccentric spur gears supported by the casing, a central gear, a gear connection between the elliptical eccentric gear and the central gear, a support connected to one of the elliptical eccentric gears, and teeth carried by the support.

5. In a combined hay rake and tedder, the combination of supporting wheels, an axle supported by the wheels, the forward end of a frame supported by the axle, suitable wheel supports for the rear portion of the frame, a shaft supported by the frame and rotated by the supporting wheels, a casing connected to the shaft, a central gear, a combined spur gear and elliptical eccentric gear, this spur gear meshing with the central gear, an elliptical eccentric gear meshing with the elliptical eccentric gear of the combined gear, a support connected to the single elliptical eccentric gear, and teeth carried by the support.

6. In a combined hay rake and tedder, the combination of supporting wheels, an axle supported by the wheels, the forward end of a frame supported by the axle, suitable wheel supports for the rear portion of the frame, a shaft supported by the frame and rotated by the supporting wheels, a casing connected to the shaft, a movable central gear, combined spur gears and elliptical-eccentric gears, the spur gears meshing with the central gear, elliptical eccentric gears meshing with the elliptical-eccentric gears of the combined gears, supports connected to the single elliptical-eccentric gears, teeth carried by the supports, and a hand lever for rocking the central gear.

7. In a combined hay rake and tedder, the combination of a rotatable frame, rake-bars carried by the frame, teeth carried by said rake-bars, eccentric gears secured to said rake-bars, means for rotating said frame, and means for rotating said eccentric gears through rotation of said frame whereby said rake teeth are given a movement during said rotation of the frame in which the horizontal range of movement of the teeth in the lower half cycle of their travel is greater than that of their upper half cycle of horizontal travel.

8. In a combined hay rake and tedder, the combination of a rotatable frame, rake-bars carried by the frame, teeth carried by said rake-bars, elliptical gears secured to said rake-bars, means for rotating said frame, and means for rotating said elliptical gears through rotation of said frame, whereby upon rotation of said frame the teeth are carried through an elliptical path and simultaneously the teeth are swung to constantly varying angles during said rotation thereby giving the teeth a lifting movement.

9. In a combined hay rake and tedder, the combination of supporting wheels, an axle supported by the wheels, a frame mounted upon the axle and slidable longitudinally thereon, a rotatable rake carried by the frame, a driving connection between said axle and rotatable rake, and means for moving said frame along the axle whereby said driving connection may be broken.

10. In a combined hay rake and tedder, the combination of supporting wheels, an axle supported by the wheels, a frame mounted upon the axle and slidable longitudinally thereon, a rotatable rake carried by the frame, a gear drive between said axle and rotatable rake, and means for moving the frame longitudinally upon the axle for disengaging said gear drive.

In testimony whereof I have hereunto set my hand in presence of two subscribing witnesses.

LEWIS E. WATERMAN.

Witnesses:
A. O. BEHEL,
E. D. E. N. BEHEL.